Feb. 17, 1959 T. G. GRANRYD 2,873,626
TRACTOR LOADERS
Original Filed Sept. 10, 1956 5 Sheets-Sheet 1

INVENTOR.
Thorwald G. Granryd
BY Paul O. Pippel
Atty.

Feb. 17, 1959

T. G. GRANRYD 2,873,626

TRACTOR LOADERS

Original Filed Sept. 10, 1956

INVENTOR.
Thorvald G. Granryd
BY Paul O. Pippel
Atty.

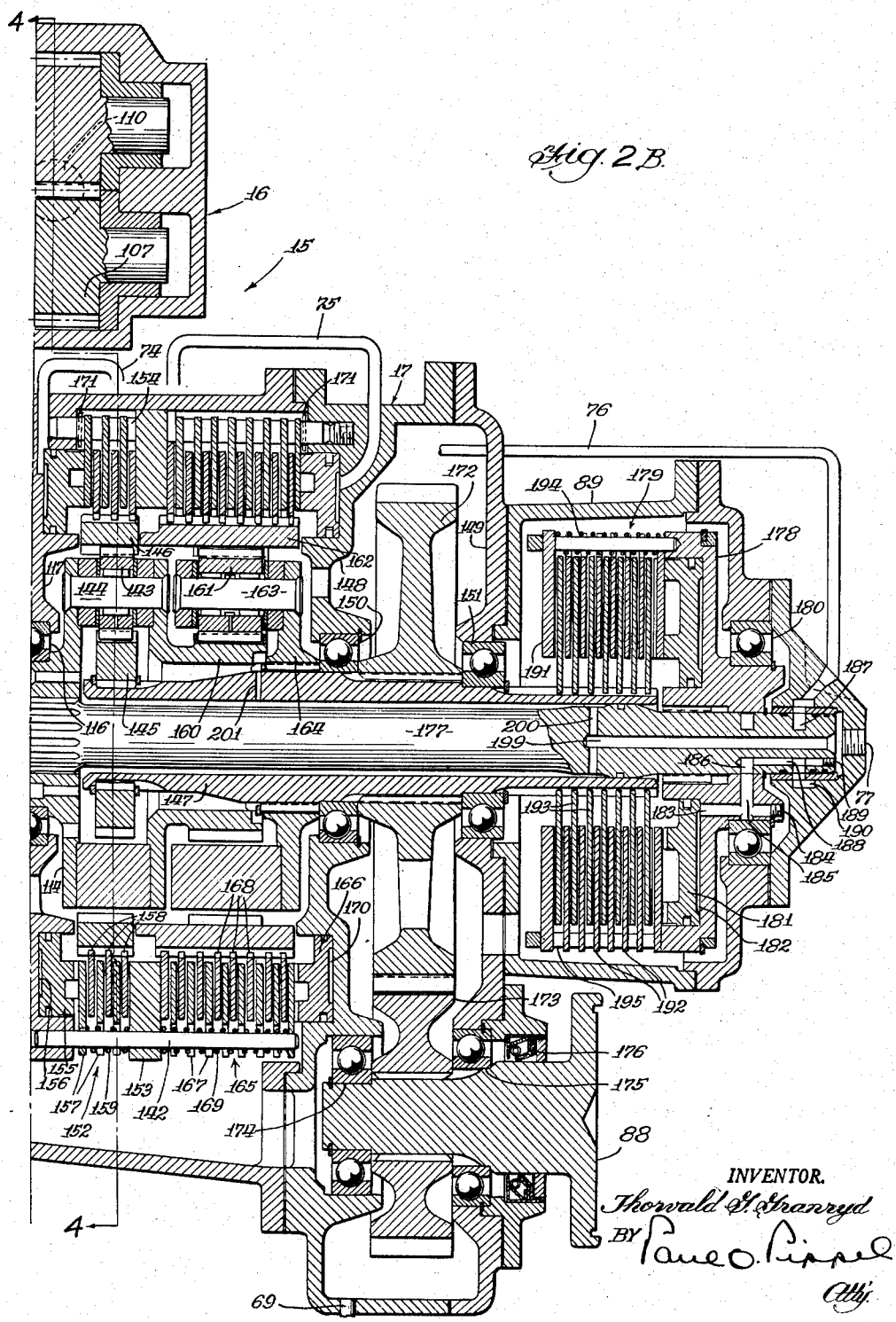

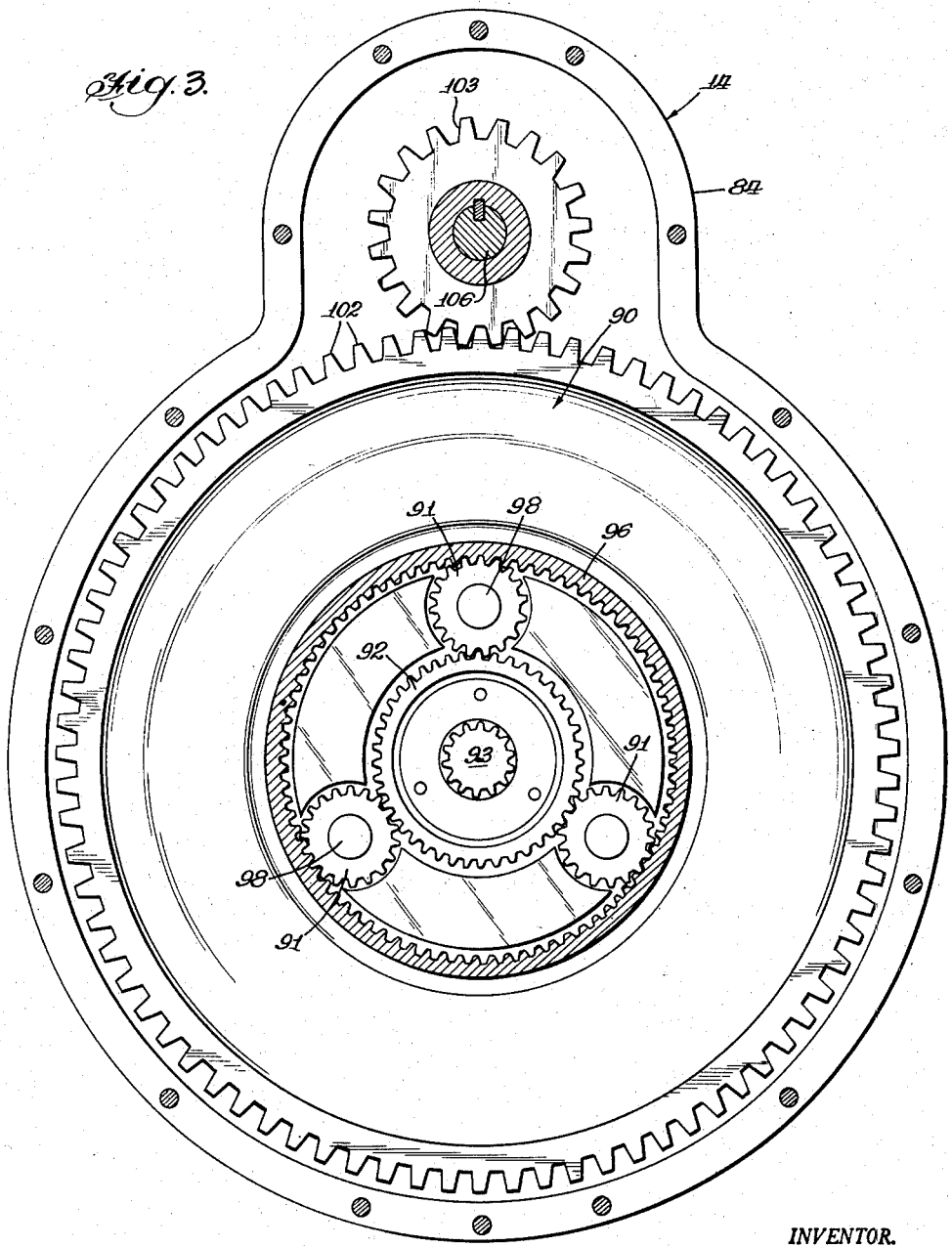

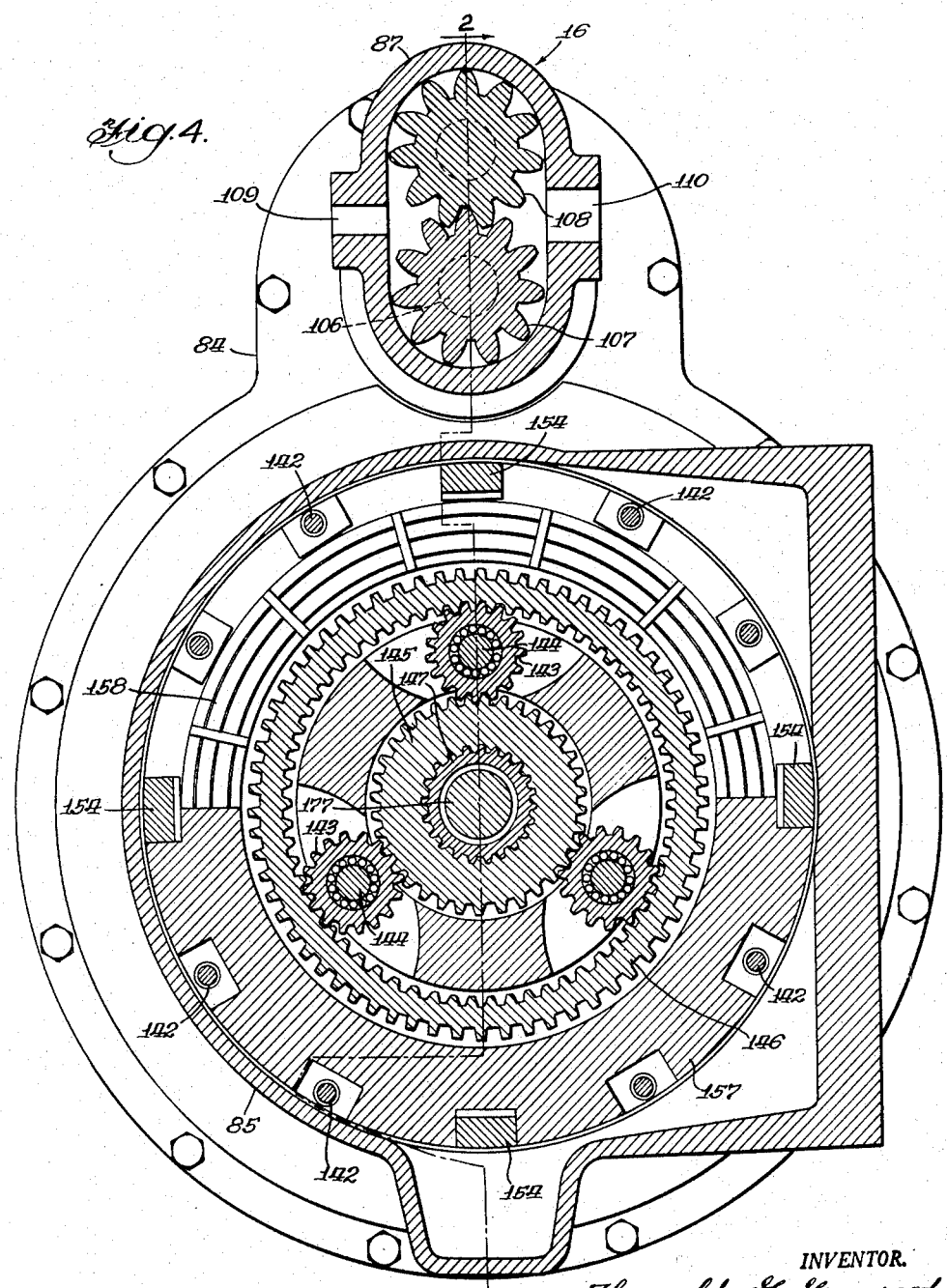

United States Patent Office

2,873,626
Patented Feb. 17, 1959

2,873,626

TRACTOR LOADERS

Thorvald G. Granryd, Libertyville, Ill., assignor to The Frank G. Hough Co., a corporation of Illinois Original application September 10, 1956, Serial No. 608,909, now Patent No. 2,842,273, dated July 8, 1958. Divided and this application October 17, 1957, Serial No. 696,898

11 Claims. (Cl. 74—765)

This invention relates generally to tractor loaders, and more specifically to improved transmission and hydraulic means for driving the traction wheels of the loader and for operating the hydraulic systems thereof, and to novel control means for controlling the various functions of the loader. This invention is a division of my previously issued Patent No. 2,842,273, issued July 8, 1958, for Tractor Loaders.

Tractor loaders as generally known in the art comprise a tractor of either the four wheel rubber tired type or the crawler-track type, and tool means carried by the tractor, and operated by an operator from an operator's station in the tractor for performing various material handling functions such as digging, carrying and dumping of different materials. The tractors generally comprise some type of power plant such as an internal combustion engine, transmission means, and hydraulic means. The power plant or engine is connected to the input of the transmission means through some clutching means, and the output of the transmission means is connected to the traction members which may be wheels or crawler-tracks. Additionally, some means for power take-off from the engine is provided for driving the necessary hydraulic pump, which in turn delivers the hydraulic fluid under pressure used for operating the tool means of the loader. Thus, it may be seen that the available power of the engine or power source is divided between the traction members and the tool means through the transmission and the hydraulic pump. The methods and constructions for dividing this available engine power as presently known in the art, all have one common disadvantage. This disadvantage arises from the fact that a tractor loader as compared to other vehicles and material handling equipment is used or operated in a unique manner. The power consumed by the traction members and the tool means is rarely used completely separately and at different times. In the usual operation of tractor loaders, power is consumed by both the traction members and the tool means at the same time. A common operation is to operate the traction means to move the tractor so that the tool means engages the material being worked while operating the tool means to work the material in some manner. As soon as the traction members meet with some resistance, a condition which is common in digging, a torque reaction is applied from the traction members to the engine through the transmission. This torque reaction will act as a brake upon the engine causing it to slow down and reduce the power which it develops. Under certain conditions the engine may be completely stalled. Now as the engine output is reduced by the torque reaction from the traction members, the portion of the engine power delivered to the tool means is also reduced so that at these critical times in the operation of the loader, the entire efficiency thereof is drastically reduced. The obstruction or resistance encountered by the traction members results in a lowered efficiency of the tool means, so that often times the tool means will have insufficient power to operate and relieve the obstruction from the traction members. The converse of this is also true. Many times in the operation of these tractor loaders the tool means, while working some material, will meet an obstruction causing a torque reaction to be applied from the tool means to the engine of the tractor, which torque reaction will reduce the power output of the engine. Again, this point in the operation of the loader generally coincides with the point at which power is being supplied to the traction members and maximum power thereat is desirable in order to maintain high tractive effort at the traction members so that the traction members may aid the tool means in overcoming the obstruction or working of the material. However with the reduced power output of the engine, less power is supplied to the traction members.

Power plants as used in tractor loaders are generally so designed that at or near the governed speed, maximum engine power is available, and the highest efficiencies for any one-sized loader are produced when the power plant is operated at the governed speed.

These inefficiencies produced in the operation of loaders as now known in the art may be more clearly seen if one specific example thereof is considered. Considering a tractor of either the four-wheel rubber-tired type or the crawler-track type having an internal combustion engine developing a certain maximum power at full throttle governed speed. Further considering that the engine is connected to a transmission through some clutching means such as a torque convertor, and that the transmission is in turn connected to drive the wheels or tracks of the tractor. Additionally, considering the tool means to be a shovel mechanism mounted forwardly of the tractor and operatively connected with the tractor through hydraulically operated boom and linkage means, and a continuously operated hydraulic pump mounted so as to be driven by a power take-off shaft from the engine. In a normal digging operation of this considered loader, the shovel mechanism is indexed in a dig position, and the transmission then operated to cause the engine to drive the wheels or tracks of the tractor in a forward direction. The tractor will thus force the shovel mechanism into the material to be dug somewhat filling the shovel. While the wheels or tracks are urging the shovel into the material being dug, the hydraulic means are operated to tilt the shovel rearwardly to retain a heaping load within the confines of the shovel. The shovel may also be raised through the material being dug in a scooping action. The loaded shovel is then held in the carrying position and transported to some remote position for dumping, whereupon the loader may again return to the material being dug to repeat the cycle. It thus may be seen that at the critical portion of the cycle, that in which both tractive effort and hydraulic power are required for maximum material handling effort, a loader arrangement such as described is very inefficient. When both the tractive effort and the hydraulic operation is required at the same time as in the digging function, a torque reaction through the hydraulic pump causes a reduction in the speed of the engine and its power output to the traction members with a corresponding decrease in tractive effort at the traction members, and conversely a torque reaction from the traction members will reduce the speed of the engine to cause a corresponding decrease in the speed of the hydraulic pump.

The power trains of tractor loaders presently known in the art have further inherent inefficiencies and disadvantages for example, it is peculiar to the tractor loader art that the transmission should be so constructed that a shift to the various speeds in the reverse direction will result in an overdrive ratio. This is advantageous in that tractor loaders when in the reverse direction are generally not engaged in the working of any material, but are being moved in preparation for digging operations in the forward direction. Since the load on the tractor loader is then at a minimum and since preparations for actual working operations should be done in a rapid manner, an overdrive ratio in reverse is desirable. These desirable ratios for a tractor loader may be produced by transmissions known in the art today, however, the resulting transmissions are then quite cumbersome and expensive and amount to little more than compromise arrangements.

As the tractor loader art has advanced, the use of power shift transmissions with torque convertors between the transmission and the engine have been made. These arrangements have one important disadvantage which results from the toque converters' inability to substantially completely absorb the momentary shock produced in shifting of the transmission. This shock is transmitted to the traction elements and, of course, felt by the operator of the loader. Another disadvantage has been that the tractor loader will creep or drag slightly when the transmission is in one of the driving positions and even when the engine is operating at its lowest speed.

It is an object of the present invention to produce power train means from an engine to the traction members and to the hydraulic system of a tractor loader which will overcome the inefficiencies and disadvantages known in tractor loaders presently used in the art today and to provide an arrangement which will substantially fulfill the unique requirements of tractor loaders.

It is another object of the present invention to provide a planetary type transmission in which all of the elements of each planetary set are identical in size to the corresponding elements of every other planetary set, and to produce speed ratios which are ideal ratios for a tractor loader.

It is another object of the present invention to provide in a tractor loader, a planetary set power divider connected to the engine with one of the members of the planetary set driving the hydraulic system for the loader and with another one of the members of the planetary set driving the traction members of the loader.

It is another object of the present invention to provide in tractor loader, a planetary set power divider wherein one member of the planetary set delivers power to a transmission and another member delivers power to the tractor hydraulic system, and wherein the transmission comprises a plurality of planetary sets of the same size as the power divider planetary set and wherein speeds produced at the traction members are ideally suited for tractor loaders.

It is another object of the present invention to provide a tractor loader with a planetary set power divider wherein one member of the planetary set drives the traction members through a transmission and wherein a novel control arrangement cooperates with the transmission to provide a brake for that member of the planetary set to lock the traction members against movement.

It is a further object of the present invention to provide a transmission for a tractor loader which will fulfill the ideal ratio requirements for a tractor loader and which is formed of a plurality of planetary sets to provide a forward and reverse direction in two different speeds. It is a further object to provide such a transmission with means for easily converting it to a three-speed forward and reverse direction transmission, and further such that the intermediate speed ratio will split the difference ratio between the low and the high speed equally, in other words, that for the particularly-sized planetary set the three used ratios from low to high will form an exact geometrical series.

A further object of the present invention is to provide a tractor loader with a transmission and a hydraulic system connected to the engine so that the transmission is operable to one position to provide a direct drive between the engine and the hydraulic system.

Other objects and the features of the present invention will be apparent upon perusal of the following specification and drawings of which:

Figure 1 is an enlarged side elevational view partially in section of the tractor portion of a tractor loader constructed according to the present invention;

Figures 2A and 2B which are intended to be placed side by side for viewing are a cross-sectional view of the transmission and power divider elements of the present invention, and taken along a line such as line 2—2 of Figure 6;

Figure 3 is a cross-sectional view of the power divider element of the present invention as taken substantially along a line such as line 3—3 of Figure 2A;

Figure 4 is a cross-sectional view of the transmission portion of the present invention and is taken along a line such as line 4—4 of Figure 2B.

Figure 1:
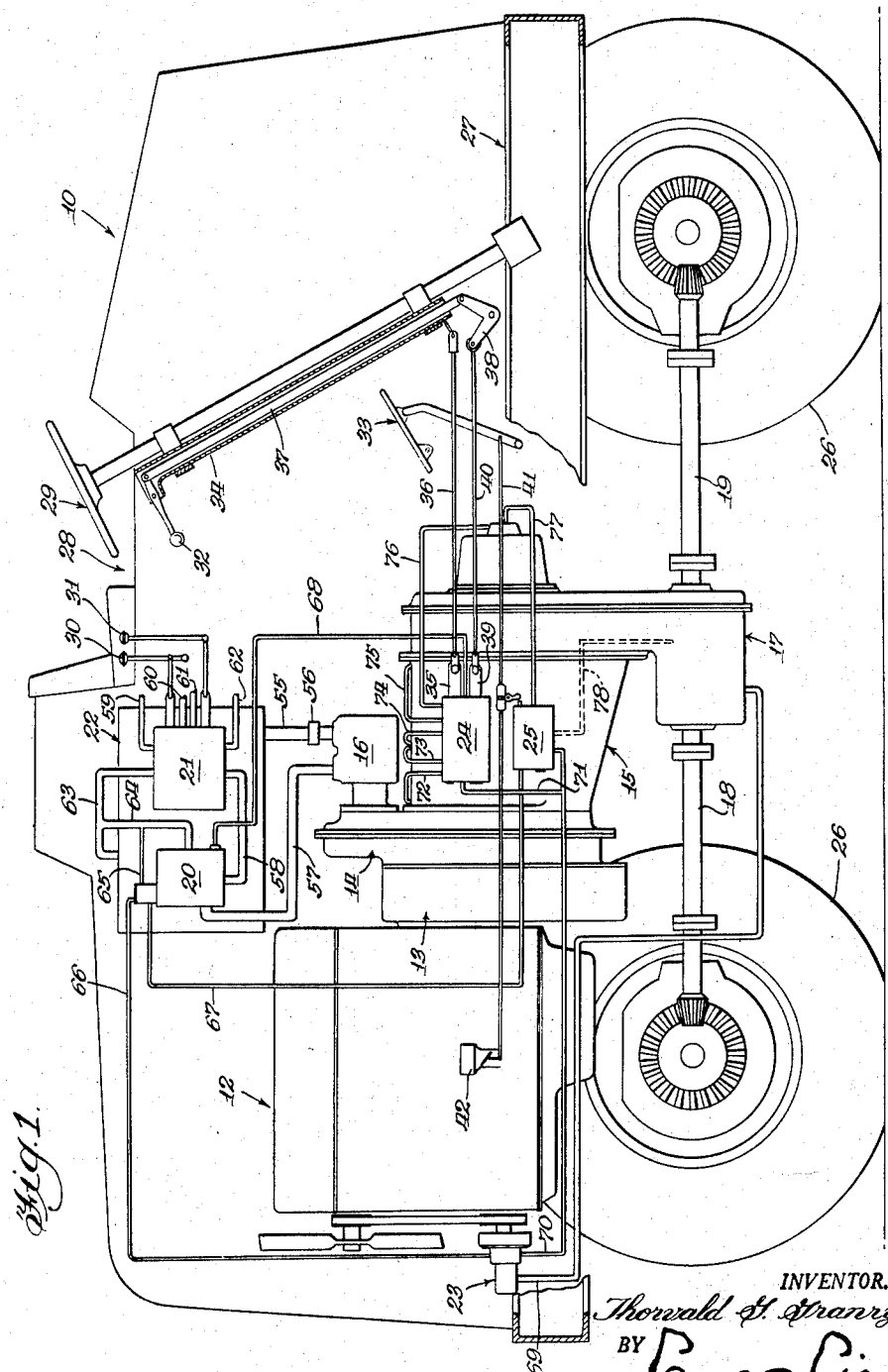

The present embodiment is a preferred embodiment but it is to be understood that changes can be made in the present embodiment by one skilled in the art without departing from the spirit and scope of the present invention.

*General description*

For a detailed description of the elements cooperating with the subject matter of this invention reference is made to my aforementioned Patent No. 2,842,273. For a general description of the present invention reference is made to the drawings. The present embodiment comprises a tractor 10 of the four-wheel rubber tired type with all of the wheels being driven. Considering Figure 1 it may be seen in the enlarged cutaway of the tractor 10, that the tractor 10 is provided with an engine 12 mounted in the rearward portion and with certain drive and control means. The flywheel housing 13 is directly mounted to the engine 12 and includes the output shaft thereof. The power divider 14 is mounted to the flywheel housing 13. To the power divider 14, the transmission 15 and the main hydraulic pump 16 are mounted. The transmission 15 includes a transfer drive case 17 carrying the output of the transmission 15 to the traction members. From the transfer drive case 17, appropriate shafts 18 and 19 deliver power through conventional universal joints and differential assemblies to the rear and front wheels respectively of the tractor 10. A hydraulic pressure compensating and regulating valve or main control valve 20 connected to the output of the main hydraulic pump 16 delivers hydraulic fluid under proper pressures to the tool means hydraulic control valve 21. Operation of the tool means hydraulic control valve 21 through the levers 30 and 31 by the operator in the operator's compartment causes the desired operation of the tool means. A hydraulic fluid reservoir 22 is also provided for the hydraulic systems. To provide proper hydraulic control pressures, about 125 p. s. i. in the present embodiment, for operating the transmission 15, and to provide an engine speed responsive valve for the main control valve 20, a governor valve and hydraulic pump assembly 23 is provided. The governor valve and hydraulic pump assembly 23 is mounted to the crankshaft of the engine 12 at the opposite end thereof from the flywheel housing 13. The hydraulic pump portion of assembly 23 delivers hydraulic fluid to the main control valve 20 through the governor valve portion of assembly 23, the transmission control valve 24, and the secondary control valve assembly 25. The transmission control valve 24 is mounted on the side on the transmission 15 and is operated by the operator of the tractor through appropriate linkage and leverage arrangements. The secondary hydraulic valve assembly 25 has a plurality of functions which are described in my aforementioned patent.

For the general description it may be stated that the secondary hydraulic valve assembly 25 regulates hydraulic fluid pressures for operation of the transmission 15, for the lubrication oil for the system, and for a portion of the main control valve 20.

Figure 2A:
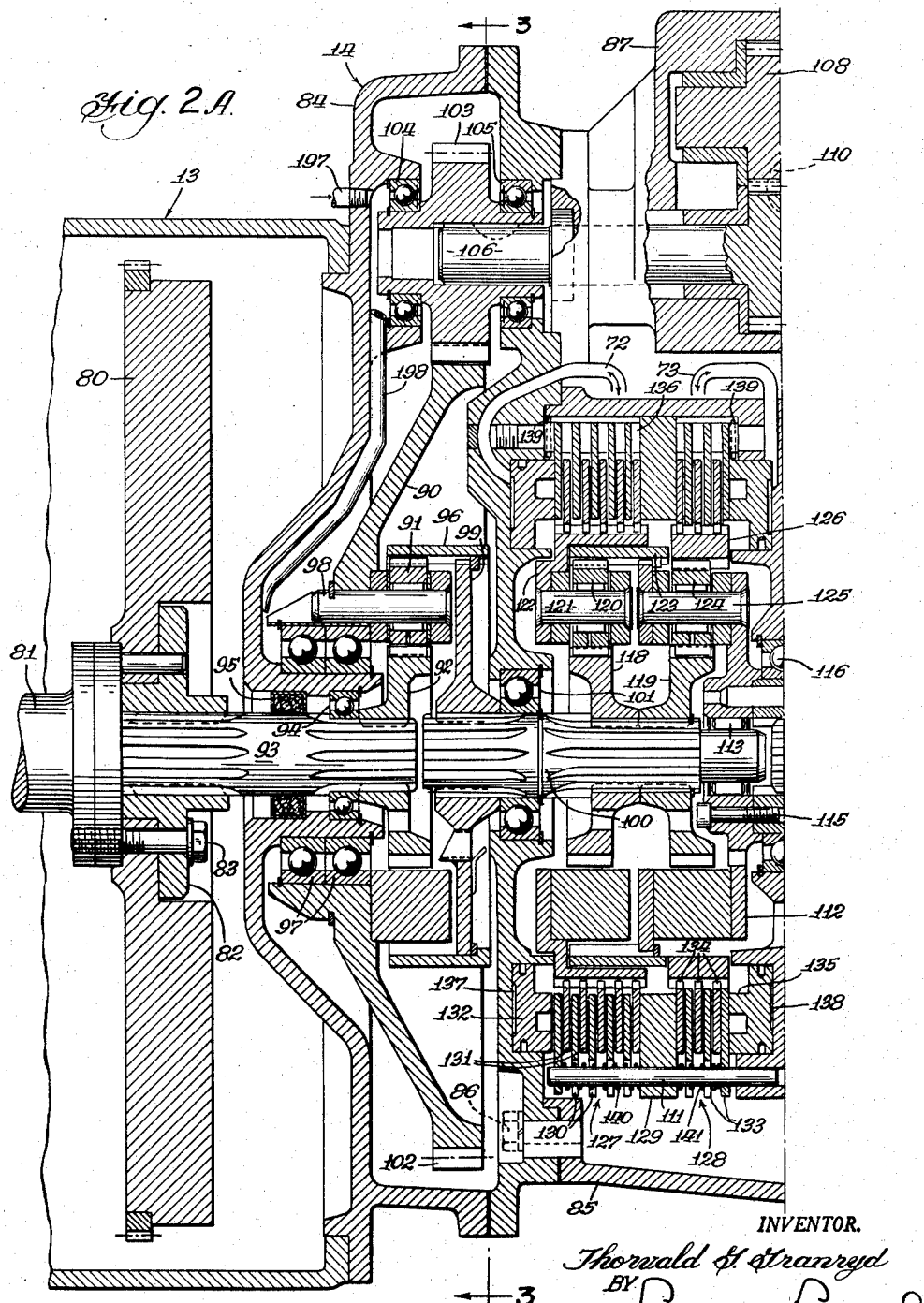

The flywheel housing 13, the power divider 14, the transmission 15 and the main hydraulic pump 16 may be seen in section in Figures 2A and 2B. Generally it may be stated that the power divider 14 comprises a planetary set wherein the output shaft of the engine 12 is connected to one of the members thereof, and the inputs of the main hydraulic pump 16 and the transmission 15 are connected to the other members of the planetary set. The transmission 15 is of the type wherein a plurality of planetary sets provide the various desired speed ratios through the operation of disk type brakes. Each component of each planetary set in both the transmission 15 and the power divider 14 is of an identical size with the comparable member of each of the different planetary sets. The basic portion of the transmission 15 is a two-speed transmission giving a low or creeper speed in one ratio and a high or travel speed in the other ratio. The basic portion of the transmission 15 is modified by a simple attachment which produces a third or intermediate speed which is exactly midway between the creeper speed and the travel speed, the three speed ratios forming an exact geometric series. In addition, the transmission 15 is operable in either the forward or rearward direction.

*Tractor arrangement*

Other advantages and new features of the present invention will be described in the following detailed description of the present invention for which reference is first made to Figure 1. The tractor 10 of the present embodiment has traction members comprising four wheels 26. The wheels 26 support the frame 27, to which the various components of the tractor are mounted. The engine 12 is disposed within the body of the tractor upon the frame 27 at the rearward portion of the tractor 10. An operator's compartment 28 mounted within the body of the tractor and positioned forwardly of the engine 12 includes a steering wheel 29 and the various necessary operating controls 31, 32 and 33. Controls 30 and 31 are the operating levers of the valve 21 for controlling the operation of the hydraulic tool means. Control 32 comprises a lever pivotally mounted within a tubular member 34. Tubular member 34 is operatively connected to spool 35 of the transmission control valve 24 through a linkage arrangement 36 so that when the control 32 is rotated about the longitudinal axis of the tubular member 34, the valve spool 35 is moved to its various operative positions. A rod 37 is mounted within the tubular member 34 for a sliding movement along the longitudinal axis thereof. The upper end of the rod 37 is pivotally connected to the inner end of the control 32. The lower end of the rod 37 is pivotally mounted to one arm of a bellcrank 38. The bellcrank 38 is pivotally mounted in the body of the tractor 10, and the other end of the bellcrank 38 is operatively connected to the valve spool 39 of the transmission control valve 24 through a linkage arrangement 40, so that when the control 32 moves in an upward and downward direction, the valve spool 39 is moved to its various operative positions. The control 33 is a foot throttle pedal and is pivotally mounted on the floor of the operator's compartment 28. The throttle pedal 33 is operatively connected through a linkage arrangement 41 with the throttle control 42 on the engine and a lever mounted in the hydraulic valve 25. As the throttle pedal 33 is depressed and raised the throttle control 42 is opened and closed. The cooperation of the linkage arrangement 41 with the control valve 25 will be described below.

*Hydraulic circuits*

In addition to the described elements, Figure 1 also shows in a somewhat diagrammatic manner the hydraulic conduits interconnecting the various parts of the hydraulic systems. The present embodiment comprises two cooperating hydraulic systems, one being the main hydraulic system for the earth-moving equipment and the other being the hydraulic system for the transmission and controls. These systems cooperate in the power divider 14 and through the control valve 20 and the regulating valve 25 in a manner to be described below. For the present explanation, the connections of the hydraulic conduits only will be described. From the hydraulic fluid reservoir 22, hydraulic fluid is supplied to the main hydraulic pump 16 through the hydraulic conduit 55. A check valve 56 is interposed in the hydraulic conduit 55. The supply port of the main hydraulic pump 16 is connected to the main hydraulic control valve 20 through a hydraulic conduit 57. A high pressure hydraulic fluid conduit 58 interconnects the control valve 20 and the control valve 21. From the control valve 21 hydraulic fluid is delivered to and returned from hydraulic rams shown in my aforementioned patent through the hydraulic conduits 59, 60. The hydraulic control valve 21 is connected to the reservoir 22 through a hydraulic conduit 63, and the control valve 20 is connected to the reservoir 22 through a hydraulic conduit 64 which is connected to hydraulic conduit 63. Another portion of the control valve 20 is connected to the reservoir 22 through another hydraulic conduit 65 connected to hydraulic conduit 64. Three other hydraulic conduits are connected to the control valve 20. These conduits are conduit 66 the other end of which is connected to the transmission hydraulic pump and governor valve assembly 23, conduit 67 the other end of which is connected to the pressure regulating valve 25, and conduit 68 the other end of which is connected to the transmission control valve 24.

The hydraulic system for the transmission includes the hydraulic conduits 69, 70, 71, 72, 73, 74, 75, 76, 77, and 78. The conduit 69 is connected between the inlet to the transmission pump of the assembly 23 and the lower portion of the transfer drive case 17; the lower portion of the transfer drive case 17 is formed in cooperation with the transmission 15 and the power divider 14 to function as a hydraulic fluid reservoir. The conduit 70 is connected between the outlet of the assembly 23 and the pressure regulating valve 25. The conduit 71 is connected between the conduit 70 and the transmission control valve 24. The conduits 72, 73, 74, 75, and 76 are each connected between the transmission control valve 24 and the transmission 15. The conduit 77 is connected between the transmission 15 and the pressure regulating valve 25. The conduit 78 which is disposed substantially within the transmission housing and the transfer drive case 17 is connected between the pressure regulating valve 25 and the lower portion of the transfer drive case 17. The exact hydraulic fluid flow through these conduits is described in my aforementioned patent.

*Power divider and transmission*

Turning next to a detailed description of the power divider 14, the main hydraulic pump 16, and the transmission 15, reference is particularly made to Figures 2A and 2B. The flywheel 80 of the engine 12 is secured to the crankshaft 81 of the engine 12 through a mounting ring 82 and a plurality of bolts such as bolt 83. These elements are disposed within the flywheel housing 13. The power divider 14 comprises a relatively flat cylindrical housing 84. The housing 84 is secured to the flywheel housing 13 by any suitable means. The transmission 15 comprises a suitable housing 85 which is bolted to the housing 84 of the power divider 14 by a number of bolts such as bolt 86. The main hydraulic pump 16 also includes a suitable housing 87 which is secured to housing 84 of the power divider 14 above the transmission 15 by any suitable means. The transfer drive case 17 is secured to the transmission housing 85 by any suitable means and includes the output shaft 88. The lower portion of the transfer drive case 17 is not shown in Figures 2A and 2B as shown in Figure 1, since the extension of the power train from the output shaft 88 to the wheels may be by many suitable means well known in the art. The transmission 15 also comprises another housing 89 which is mounted to the transfer drive case 17 at the rear end of the transmission 15 or at the forward end thereof relative to the forward end of the tractor 10. This housing 89 may be removed from the transfer drive case 17, and upon its removal therefrom the transmission 15 is simply converted to a two-speed transmission in the forward and reverse directions. With the addition of the housing 89 and the elements included therein, the transmission 15 is a three-speed forward and reverse direction transmission with the intermediate speed ratio falling exactly midway between the low speed and high speed ratios.

The power divider portion 14 of the present invention further comprises a planetary set of a planet carrier 90, which may also be seen in Figure 3, three planet pinion gears 91, a sun gear 92, and a ring gear 96. The sun gear 92 is splined on one end of a stub shaft 93. The other end of the stub shaft 93 is splined within the mounting ring 82. A ball bearing set 94 supports the stub shaft 93 in the housing 84 and a shaft oil seal 95 mounted about the stub shaft 93 within an opening through the housing 84 prevents lubricating oil from flowing into the flywheel housing 13. The planet carrier 90 is journalled to the housing 84 through the ball bearing sets 97. The planet pinion gears 91 which mesh with the sun gear 92 are carried by the planet carrier 90 through shafts 98 which are keyed through suitable openings in the planet carrier 90. The ring gear 96, which meshes with the planet pinion gears 91, is keyed to a carrier 99 which in turn is splined on a stub shaft 100. The stub shaft 100 is journalled through an opening in the housing 84 by a ball bearing set 101. The stub shafts 93 and 100 are in axial alignment, and the other end of the stub shaft 100 extends into the transmission housing 85 of the transmission 15.

The periphery of the planet carrier 90 is provided with gear teeth 102. The gear teeth 102 are meshed with a small spur gear 103. The spur gear 103 is rotatively mounted in the upper portion of the housing 84 by means of the ball bearing sets 104 and 105. The spur gear 103 is keyed to the operating shaft 106 of the main hydraulic pump 16.

The main hydraulic pump 16, in the present embodiment, is a gear-type fixed displacement pump of any suitable type well known in the art. Other suitable hydraulic pumps may be used, however, the pump of the present embodiment is of a size sufficient to intermittently absorb the entire output torque of the engine 12. The operating shaft 106 extends from the housing 84 into the pump housing 87 and is integrally formed with the pump gear 107, as may also be seen in Figure 4. The pump gear 107 meshes with the pump gear 108, and both pump gears 107 and 108 are suitably journalled in the pump housing 87. The pump housing 87 is also provided with an inlet port 110 and an outlet port 109. The hydraulic fluid conduit 55 is connected to the port 110 and the hydraulic fluid conduit 57 is connected to the port 109.

It thus may be seen that the engine 12 drives the sun gear 92 and that the torque delivered therethrough is applied through the planet pinion gears to the planet carrier 90 and the ring gear 96. The amount of torque delivered to the stub shaft 100 will be proportional to the torque reaction supplied by the main hydraulic pump 16 to the planet carrier 90 and the torque delivered to the main hydraulic pump 16 will be proportional to the torque reaction supplied by the stub shaft 100 to the ring gear 96.

The end of the stub shaft 100 projecting within the casing 85 of the transmission 15 is rotatively supported within a central opening in the planet carrier 112 through the roller bearings 113. The planet carrier 112 is secured to another planet carrier 114 by means of a number of bolts such as bolt 115. The planet carriers 112 and 114 are rotatively mounted within the casing 85 through a ball bearing set 116. The ball bearing set 116 is carried within the casing 85 by inwardly extending flange portions 117 of the housing 85. The stub shaft 100 is provided with two sun gears 118 and 119, which are splined thereon between the ball bearing set 101 and the roller bearings 113. The sun gear 118 meshes with three planetary pinion gears 120. The planetary pinion gears 120 are rotatively carried on shafts 121, which in turn are secured to a planet carrier 122. The planet pinion gears 120 also mesh with a ring gear 123. The ring gear 123 is secured to the planet carrier 112. The sun gear 119 meshes with three planet pinion gears 124. The planet pinion gears 124 are rotatively carried on shafts 125, which in turn are carried by the planet carrier 112. The planet pinion gears 124 also mesh with a ring gear 126. Brakes 127 and 128 are provided for the planet carrier 122 and the ring gear 126 respectively. These brakes are of the multiple disk type friction brakes. One pressure reaction plate 129 in a form of an annular ring is provided for both of the brakes 127 and 128. Brake 127 further comprises a plurality of stationary friction disks 130, a plurality of rotating friction disks 131 and an annular piston or pressure plate 132. Brake 128 further comprises a plurality of stationary friction disks 133, a plurality of rotating friction disks 134 and an annular piston or pressure plate 135. The rotating friction disks 131 are splined upon the outer surface of the planetary carrier 122 and positioned in an alternating order with the stationary friction disks 130. The stationary friction disks 130 are secured against rotational movement by a plurality of torque or mounting rods 136. The torque rods 136 are four in number, and are equally spaced about the periphery of the stationary friction disks 130 in slots formed therein, so that the disks 130 are slidable therealong. This construction is the same as the showing in Figure 4 relative to brake 152 and its torque rods 154. The pressure reaction plate 129 is secured substantially at the longitudinal center of the torque rods 136, and one end of each of the torque rods 136 is mounted in a suitable opening in the end of the casing 85, while the other ends are mounted in suitable openings in the inwardly projecting flange portion 117 of the casing 85. Further, means such as set screws are provided in those openings to permit some longitudinal adjustment of the torque rods 136 and the pressure reaction plate 129. Thus, any compression of the rotating friction disks 131 and the stationary friction disks 130 against the pressure reaction plate 129 will result in a transfer of the torque of the rotating friction disks 131 to the stationary friction disks 130, in turn to the torque rods 136, and therefrom to the casing 85. The pressure plate 132, for compressing the rotating and stationary friction disks against the pressure reaction plate 129, is disposed within an annular groove in the housing 84 for limited sliding movement against the friction disks 130 and 131. The other side of the pressure plate 132 is provided with an annular groove 137, which groove is open to a passageway through the housing 84 leading to a connection with hydraulic fluid conduit 72. To restore the brake 127, a plurality of restoring rods 111 and coiled springs 140 are provided. Figure 2 shows one of the restoring rods 111 and coiled springs 140 because of the particular section taken as shown along line 2—2 of Figure 4. Figure 4 shows the similar restoring rods 142 for the brakes 152 and 165. The restoring rods 111 are eight in number and are disposed in pairs between the torque rods 136 in slots about the periphery of the stationary friction disks 130. The restoring rods 111 are also mounted through the pressure reaction plate 129 and into suitable openings in the inwardly projecting flange portion 117 of the casing 85. The coiled springs 140 are mounted upon the restoring rods 111 and react against the pressure reaction plate 129 and the stationary friction disk 130 furthest therefrom to bias the brake 127 in the off position. In the brake 128, the stationary friction disks 133 are also mounted about the torque rods 136, and the rotating friction disks 134 are splined unto the outer surface of the ring gear 126. The pressure plate 135 is slidably mounted in an annular groove in the inwardly projecting flange portion 117 of the housing 85 and in cooperation with the friction disks 133 and 134. The pressure plate 135 is also provided with an annular groove 138 opening into a passageway formed through the housing 85 and connected to the hydraulic fluid conduit 73. The brake 128 also uses the same restoring rods 111 as used for brake 127. Coiled springs 141 are provided for biasing brake 128 to the off position. Assembly of this portion of the transmission is greatly simplified through its construction and through the use of the pins 139. In the assembly of the transmission, and with the casing 85 removed from the casing 84, the brakes 127 and 128 are completely assembled on the torque rods 136 except for the pressure plates 132 and 135. The pressure reaction plate 129 is secured to the plurality of torque rods 136, the friction disks 130 and 131 are properly stacked on one side of the pressure reaction plate 129 and the friction disks 133 and 134 are properly stacked on the other side of the pressure reaction plate 129. The restoring rods 111 and springs 140 and 141 for the brake 127 and the brake 128 respectively, are also properly mounted in cooperation with the friction disks 130, 131, 133 and 134. The pins 139 are then inserted through the ends of the torque rods 136 with all of these elements being held together in proper alignment as a unit. This unit is then mountable within the transmission housing 85 with the torque and restoring rods 136 and 111 being projected into the proper holes in the inwardly projecting flange portion 117 of the casing 85, and with the rotating friction disks 131 and 134 being splined onto the planet carrier 122 and the ring gear 126 respectively. With the pressure plate 132 and the stub shaft 100 in place, the housing 84 may be then secured to the housing 85. The pins 139 are spaced apart a distance sufficient to permit the various elements therebetween to be so positioned that the brakes 127 and 128 are in the off condition.

From the foregoing may be seen that when high pressure hydraulic fluid is delivered through conduit 72, high pressure hydraulic fluid will enter the annular groove 137, and the force thereby produced acting on the pressure plate 132 and against the housing 84, will move the pressure plate 132 to slide the friction disks 130 and 131 toward the pressure reaction plate 129. The friction created between the friction disks 130 and 131 will cause the planet carrier 122 to be held stationary. Assuming that no high pressure hydraulic fluid is delivered through conduit 73 at this time, any torque produced by the stub shaft 100 will rotate the sun gears 118 and 119. Since the planet carrier 122 is held stationary, the rotating sun gear 118 will rotate the planet pinion gears 120 which will in turn cause the ring gear 123 to be rotated in a direction opposite from that of the stub shaft 100. Since the ring gear 123 is secured to the planet carrier 112, the carrier 112 and the planet carrier 114 locked thereto, will be rotated in the same direction as the ring gear 123. The ring gear 126 will be rotated by the planet pinion gears 24. If the height pressure hydraulic fluid is released from conduit 72 and applied to conduit 73, the restoring springs 140 will cause the friction between the friction disks 130 and 131 to be released and the planet carrier 122 will be free to rotate. The high pressure hydraulic fluid in conduit 73 will pass through the passageway in the housing 85 and enter the annular groove 138 in the pressure plate 135. The force of the high pressure hydraulic fluid applied between the pressure plate 135 and the inwardly projecting flange portion 117 of the housing 85, will cause the pressure plate 135 to force the friction disks 133 and 134 together against the pressure reaction plate 129 and against the bias of the restoring spring 128. This friction between the friction disks 133 and 134 will cause the ring gear 126 to be held stationary. Assuming the same rotation of the stub shaft 100 as previously mentioned, the rotating sun gear 119 will rotate the planet pinion gears 124 to cause them to walk around the ring gear 126. This rotation and translation of the planet pinion gears 124 will cause a rotation of the planet carrier 112 in the same direction as the stub shaft 100 is rotating and at a reduced speed from that at which the planet gear 112 was rotated when the brake 127 was applied. The planetary set controlled by the brake 127 is the planetary set for the reverse direction, and the planetary set controlled by the brake 128 is the planetary set for the forward direction. The planet carrier 112 is the output member for both directions and in the forward direction planet carrier 112 is rotated at a slower speed than in the reverse direction. Therefore, in the forward direction brake 128 is on and brake 127 is off and in the reverse direction brake 127 is on and brake 128 is off.

Since planet carrier 114 is bolted to planet carrier 112, the planet carrier 114 is the input member for the remainder of the transmission, the portion producing the various speed ratios. In describing this portion of the transmission, reference is also made to Figure 4. As the transmission of the present invention is a two-speed transmission convertible to a three-speed transmission, that portion producing the two speeds will be described first. The planet carrier 114 carries three planet pinion gears 143. These planet pinion gears 143 are rotatively mounted onto the shafts 144 which in turn are secured to the planet carrier 114. The planet pinion gears 143 mesh with a sun gear 145 and a ring gear 146. The sun gear 145 is splined and keyed to the tubular member 147. The tubular member 147 is rotatively mounted through walls 148 and 149 of the transfer drive case 17 by means of the two ball bearing sets 150 and 151. The ring gear 146 is provided with a brake 152 which is similar in construction to brakes 127 and 128 previously described. A pressure reaction plate 153 is secured to a plurality of torque rods 154, which rods 154 are mounted into openings on the opposite side of the flange 117 in which the torque rods 136 are mounted. The flange portion 117 of the housing 85 is also provided with a suitable groove for the annular piston or pressure plate 155. The face of the pressure plate 155 within the annular groove of the flange 117, is provided with an annular groove 156. The annular groove 156 is in open communication with a passageway extending through the housing 85 and connected to conduit 74 so that any high pressure hydraulic fluid supplied through conduit 74 will cause the pressure plate 155 to be moved out of the groove in the flange 117. The friction disks for the brake 152 comprises a plurality of stationary friction disks 157 which are disposed between the pressure plate 156 and the pressure reaction plate 153, and are carried by the torque rods 154, and the rotating friction disks 158, which are splined onto the outer surface of the ring gear 146 and disposed in an alternating relationship with the stationary friction disks 157. Coiled restoring springs 159 mounted about a number of restoring rods 142, and between the pressure reaction plate 153 and the stationary friction disk 157 adjacent the pressure plate 155 bias the brake 152 in the off condition when no high-pressure hydraulic fluid is delivered to conduit 74. Thus it may be seen that when high pressure hydraulic fluid is delivered through conduit 74, the pressure plate 155 is moved to operate the brake 152 to the break-on condition wherein the ring gear 146 is held stationary.

The planet carrier 114, which is locked to planet carrier 112, also carries or has secured thereto, a sun gear 160, so that sun gear 160 is rotated whenever the planet carrier 114 is rotated. Sun gear 160 meshes with three planet pinion gears 161, which in turn mesh with a ring gear 162. The planet pinion gears 161 are rotatively mounted on three shafts 163 which are carried by a planet carrier 164. The planet carrier 164 is splined on the tubular member 147. The ring gear 162 is provided with a brake 165. The brake 165 is similar to the brakes previously described. Brake 165 has the following elements in common with brake 152: The pressure reaction plate 153, and the plurality of torque and restoring rods 154 and 142. Brake 165 further comprises the annular piston or pressure plate 166 slidably mounted in an annular groove in wall 148, stationary friction disks 167 mounted on the torque rods 154, rotating friction disks 168 splined on the outer surface of the ring gear 162, and a plurality of coiled restoring springs 169 mounted about the restoring rods 142 and biasing the brake 165 in the off position. The surface of the pressure plate 166 adjacent to the wall 148 is provided with an annular groove 170. The annular groove 170 of the pressure plate 166 is in open fluid communication with a passageway formed through the transfer case housing 17 and connected to conduit 75. The multiple friction disks 157 and 158 of the brake 152, and the multiple friction disks 167 and 168 of the brake 165 with the plurality of torque and restoring rods 154, 142, and the pressure reaction plate 153, are assembled together as a unit in a manner similar to that previously described for brakes 127 and 128. The pins 171 mounted through the torque rods 154 maintain a unitary package of the two brake assemblies 152 and 169. When high pressure hydraulic fluid is delivered through conduit 75, the pressure plate 166 is moved to compress the friction disks 167 and 168 together against the pressure reaction plate 153. This causes the brake 169 to be operated to the brake-on position, and ring gear 162 will be held stationary.

The planetary gear set controlled by the brake 152 is the planetary set for the travel or high speed ratio, and the planetary set controlled by the brake 165 is the planetary set for the creep or low speed ratio. If brake 152 is on and brake 169 is off, the ring gear 146 will be held stationary, while the ring gear 162 will be free to rotate. Power from the previous section of the transmission will rotate planet carrier 114. This will cause a translation and rotation of the planet pinion gears 143, and the planet pinion gears 143 will in turn drive the sun gear 145, in turn driving the tubular element 147. If the brake 165 is on and the brake 152 is off, the ring gear 146 will be free to rotate and the ring gear 162 will be held stationary. The torque supplied to the planet carrier 114 will then directly rotate the sun gear 160. The rotating sun gear 160 will drive the planet pinion gears 161 about the ring gear 162. This translation and rotation of the planet pinion gears 161 will cause a low speed rotation of the planet carrier 164, and the planet carrier 164 will cause a corresponding rotation of the tubular element 147.

The tubular element 147 delivers torque to the output member 88 through the transfer drive case 17. A gear 172 is splined onto the tubular element 147. The gear 172 is meshed with a gear 173. The gear 173 is splined onto the output member 88. The output member 88 is rotatively mounted in the transfer drive case 17 through two sets of ball bearings 174 and 175. A shaft sealing assembly 176 prevents any lubricating oil from leaking from the transfer drive case 17. The shaft sealing assembly 176 may be of any suitable type well known in the art. It should be noted that the arrangement of the output member 88 and the transfer drive case 17 in Figure 2B is somewhat different from that shown in Figure 1. The showing in Figure 2B has been shortened and simplified for a clear explanation. The extension and inclusion of the output member 88 in the transfer drive casing 17, as shown in Figure 1, may be by any means well known in the art.

The intermediate speed ratio is picked up in the planet carrier 114. This is accomplished by a shaft 177. The shaft 177 extends from the intermediate speed ratio housing 89, through the tubular member 147, with the other end thereof splined into the hub of the planet carrier 114. The intermediate speed ratio housing 99 is fastened to the transfer drive case 17 by any suitable means. The portion of the shaft 177 extending within the intermediate speed ratio housing 89 is keyed within clutch member 178 of the clutch 179. The clutch member 178 is rotatively mounted in the housing 89 through the ball bearing set 180. The clutch 179 is of the multiple disk friction type clutch. The clutch member 178 of the clutch 179 is provided with an annular groove portion into which an annular piston or pressure plate 181 is mounted. The pressure plate 181 is provided with an annular groove 182 in the surface adjacent the clutch member 178. This annular groove 182 is in direct fluid communication with a passageway 183 formed in the clutch member 178. The passageway 183 is formed in the clutch member 178 by drilling a suitable hole through one side thereof and then sealing the outer end of the hole with a plug 184. The passageway 183 is intersected by another passageway 185 which extends to and in a constant fluid communicating relationship, with an annular groove 186 formed in the shaft 177. The shaft 177 has another annular groove 187 axially spaced from the annular groove 186. The annular grooves 186 and 187 are interconnected by a passageway 188 which is drilled through the end of the shaft 177 to intersect annular grooves 186 and 187, and having the outer end sealed by a plug 189. The annular groove 187 is in radial alignment with an annular groove 190 formed in the intermediate speed ratio housing 89. The annular groove 190 is connected through a suitable passageway to hydraulic fluid conduit 76. Thus, it may be seen that the following hydraulic fluid path is provided between conduit 76 and the annular groove 182 in the clutch member 178; from conduit 76 through a passageway to annular groove 190, annular groove 187, passageway 188, annular groove 186, passageway 185, and passageway 183 to annular groove 182. The clutch 179 further comprises a pressure reaction plate 191 carried by the clutch member 178 and axially spaced from the pressure plate 181, a plurality of friction disks 192, another plurality of friction disks 193, and a number of restoring springs 194. The friction disks, 192 are formed to have a plurality of radially outwardly extending lugs, and are carried by the clutch member 178 through suitable slots 195 into which the lugs are positioned, between the pressure reaction plate 191 and the annular piston or pressure plate 181. The friction plates 193 are splined onto the outer end of the tubular member 147 and are positioned alternately with the friction disks 192. The restoring springs 194 bias the friction disks 192 and 193 to the clutch-off position. When the clutch 179 is in the off position, the friction disks 193 are freely rotated by the tubular member 147, while the friction disks 192 are freely rotated by the shaft 177. When high pressure hydraulic fluid is delivered to conduit 76, the pressure plate 181 is moved to compress the friction disks 192 and 193 together against the pressure reaction plate 191. The friction created between the friction disks 192 and 193 will cause the shaft 177 and the tubular member 147 to be rotated together. When brakes 152 and 165 are in the off position, and clutch 179 is in the on position or energized, power in the intermediate speed ratio is delivered over the following path: from the planet carrier 114 through the shaft 177, through the clutch 179, through the tubular member 147, gear 172, gear 173 to the output member 88.

Turning next to a detailed description of the means for lubricating the power divider 14 and the transmission 15 of the present invention, lubricating fluid is delivered in a manner to be described below to conduit 77, and another conduit (not shown) connected between conduit 77 and port 197 through housing 84 of the power divider 14. In the present embodiment the lubricating fluid is delivered at a pressure of about 50 p. s. i. From port 197 in the power divider 14 the lubricating fluid or oil flows initially in three paths: one path directly into ball bearing set 104, a second path through the central opening in gear 103, between shaft 106 and a slot in gear 103 to lubricate the ball bearing set 105, and a third path downward and through the section of tubing 198. The major portion of the lubricating fluid flow will be through tubing section 198, and will pass from the lower end thereof to and through the ball bearing sets 97. From the ball bearing sets 97, the lubricating oil passes into the planetary set of the power divider 14. A portion flows downward to lubricate ball bearing set 94, another portion flows over the various parts of the planetary set and lubricates the roller bearings for the planet pinion gears 91 by a pressure action of the oil through small radial holes in the planet pinion gears 91 as the planet pinion gears 91 rotate between the ring gear 96 and the sun gear 92. The lubricating oil collects in the lower portion of the housing 84 and flows therefrom through an opening between housings 84 and 85 adjacent bolt 86 into the transmission housing 85. From the transmission housing 85, the oil flows into the transfer drive case 17 and collects in the sump formed in the bottom portion of the transfer drive case 17. From the sump in the bottom portion of the transfer drive case 17, the lubricating oil will flow through conduit 69 to return to the pump.

For the transmission 15, the lubricating oil flows through conduit 77, through passageway 199 in shaft 177, and through passageway 200 into the space between shaft 177 and tubular member 147. From that space, a portion of the lubricating oil flows through the radial passageway 201 in the tubular member 147 to lubricate the first speed planetary set, that associated with brake 165. All of the roller bearings of the various planet pinion gears are lubricated in the same manner as that described relative to planet pinion gears 91. Another portion of the lubricating oil between shaft 177 and tubular member 147 flows through the space between the planet carrier 114 and the end of the tubular member 147 to lubricate the third speed planetary set, that associated with brake 152. A portion of the oil lubricating the third speed planetary set flows through openings in the planet carrier 114 to lubricate ball bearing set 116. Another portion of the oil between shaft 177 and the tubular member 147 flows between the splines of the shaft 177 and the planet carrier 114 to and through the roller bearings 113 to lubricate those bearings, and to the planetary sets for the forward and reverse directions. Part of the oil lubricating the forward and reverse direction planetary sets also lubricates ball bearing set 101. Ball bearing sets 174 and 175 are lubricated by return flow from transmission 15, through a lower inclined trough on housing 85. Gear 173 is partly submerged in oil in the sump, oil being picked up by gear 172, ball bearing sets 150 and 151 being splash lubricated by oil picked up by gear 172. The ball bearing set 180 and the clutch 179 are lubricated by the leakage of oil past the various oil seals on the shaft 177. The oil return from the transmission 15 is also to the sump portion in the transfer drive case 17.

The transmission 15 and the power divider 14 of the present invention have many advantages in construction, maintenance, operation and result, note of which should be made. Firstly, all of the planetary sets are of the same size in both the power divider 14 and the transmission 15. The results of this construction will be described below. Further, the construction used in the transmission, in addition to the results in operation, provides for relatively simple maintenance and conversion between a two-speed forward and reverse direction transmission to a three-speed forward and reverse transmission. To convert the transmission 15 to a two speed transmission, it is merely necessary to remove the housing 89 and the shaft 177 from the remainder of the transmission 15, and, in place thereof, to provide a tubular cap having conduit 77 connected through the end thereof. In this conversion, the intermediate speed ratio is removed with the first or creeper speed ratio and the third speed or travel speed ratio remaining. Also in this conversion, there is no necessity for disturbing the transfer drive case 17 in any respect. Further, when the transmission of the subject invention is used as a three speed transmission, the only rotating clutch in the entire transmission is in that portion which is easily and simply removable from the remainder of the transmission. This advantage is important when it is considered that brakes such as brakes 127, 128, 152, and 165 as known in the art are relatively rugged and reliable as compared to rotating clutches such as clutch 179. Thus, the relatively weaker elements are in the member which is most easily removed for servicing.

Considering the size of the various planetary sets in relation to the construction and operation of the transmission 15 and power divider 14, the planetary sets of the present embodiment have been constructed of the following size: each of the ring gears is provided with 78 teeth, each of the sun gears is provided with 42 teeth, and each of the planet pinion gears is provided with 18 teeth. Assuming a counterclockwise rotation of the shaft 93 splined to the flywheel 80 of the engine 12 when looking from the transmission toward the flywheel 80, with the planet carrier 90 relatively stationary, power input is to the sun gear 92 and power output is from the ring gear 96. This size and construction results in a speed reduction of 1.86 to 1 and a clockwise direction of rotation of ring gear 96. For the forward direction, brake 128 is on and brake 127 is off. Shaft 100 drives sun gear 119 for the power input, and the output power is on the planet carrier 112. This results in a 2.86 to 1 speed reduction and a clockwise rotation of planet carrier 112. The total speed reduction between the shaft 93 and the planet carrier 112 will be 5.32 to 1. With the transmission 15 operated to the travel or third speed ratio in the forward direction, brakes 128 and 152 will be in the on position and brakes 127 and 169, and clutch 179 will be in the off position. In this condition, the output power on the planet carrier 112 is delivered as a power input to planet carrier 114, and the output is from the sun gear 145 and the tubular member 147. This arrangement will produce an overdrive speed of 1 to 2.86 between planet carrier 114 and sun gear 145, with the tubular member 147 rotating in a clockwise direction. The total speed change between shaft 93 and tubular member 147 will be a speed reduction of 1.86 to 1. For the intermediate or second speed ratio in the forward direction, brake 128 and clutch 179 will be in the on position, and brakes 127, 152 and 169 will be in the off position. In this condition the shaft 177, splined to the planet carrier 114 which in turn is bolted to the planet carrier 112, is the input member and tubular member 147 will be the output member. The change speed ratio between this input and output member will be at a 1 to 1 ratio in a clockwise direction of rotation of tubular member 147. This will result in a total speed reduction between shaft 93 and tubular member 147 of 5.32 to 1: For the creeper or first speed ratio in the forward direction brakes 128 and 165 are in the on position and brakes 127 and 152 and clutch 179 are in the off position. In this condition, the power input is the sun gear 160, which is secured to planet carrier 114 in turn secured to planet carrier 112, and the output member is the planet carrier 164 splined to the tubular member 147. The speed change between this input and output member is a 2.86 to 1 speed reduction with a clockwise direction of rotation of tubular member 147. The total speed change between the shaft 93 and the tubular member 147 is a speed reduction of 15.20 to 1.

For the reverse direction, brake 127 is in the on position, and brake 128 is in the off position. Assuming again a counterclockwise rotation of shaft 93 looking from the transmission toward shaft 93, as previously noted the power divider 14 produced a speed reduction on shaft 100 of 1.86 to 1 with a clockwise direction of rotation of the ring gear 96. With brake 127 in the on position, shaft 100 supplies power to the input member, the sun gear 118. The output member is the ring gear 123 which is secured to the planet carrier 112. This arrangement produces a 1.86 to 1 speed reduction between the input and output members with a change in direction so that the ring gear 123 and the planet carrier 112 are rotated in the same direction as shaft 93, counterclockwise. The total speed change between shaft 93 and planet carrier 112 is a speed reduction of 3.46 to 1. Considering next the various speed ratios for the reverse direction, and taking first the travel or third speed ratio, the brakes 127 and 152 are then in the on position, and the brakes 128 and 165 and the clutch 179 are in the off position. In this arrangement, the planet carrier 114, which is secured to planet carrier 112 is the driving or input member and the sun gear 145 and the tubular member 147 are the output or driven members. The speed change between the input and output members is the same as previously described for the forward direction, that of an overdrive of 1 to 2.86. This results in a total speed change of a speed reduction of 1.21 to 1 between shaft 93 and tubular member 147 with a clockwise direction of rotation of tubular member 147. For the intermediate or second speed in the reverse direction, brake 127 and clutch 179 are in the on position and brakes 128, 152 and 165 are in the off position. The input and output members are the same as previously described for the forward direction giving a 1 to 1 speed ratio with total speed change of 3.46 to 1 between shaft 93 and tubular member 147 with a clockwise direction of rotation of tubular member 147. In the creeper or first speed in the reverse direction, brakes 127 and 165 are in the on position, and brakes 128 and 152 and clutch 179 are in the off position. Again, the speed change between the input and output members is the same as noted for the creeper speed in the forward direction, 2.86 to 1, and in the present arrangement, the total speed change between the shaft 93 and tubular member 147 is a speed reduction of 9.90 to 1 with a clockwise direction of rotation of tubular member 147.

These various speed ratios produced in both the forward and reverse directions may be summarized as follows:

|  | Forward | Reverse |
| --- | --- | --- |
| Travel Speed Ratio | $\dfrac{1.86}{1}$ | $\dfrac{1.21}{1}$ |
| Intermediate Speed Ratio | $\dfrac{5.32}{1}$ | $\dfrac{3.46}{1}$ |
| Creeper Speed Ratio | $\dfrac{15.20}{1}$ | $\dfrac{9.90}{1}$ |

These listed speed ratios in the two directions are all converted to vehicle speeds through the transfer drive case 17, and the axles to the driving wheels 26. From the tubular member 147 through the transfer drive case 17 to the axles, a conventional overdrive ratio is produced, and from the axles to the driving wheels 26 a conventional reduction ratio is produced. The specific speed ratios gained from the transmission 15 and power divider 14 and thereafter applied to the driving wheels 26 of the tractor 10 results in a unique and highly desirable combination of ratios for the operation of a tractor loader. A comparison between the ratios in the forward and the reverse direction shows that as opposed to the forward direction ratios, overdrive ratios are produced in the reverse direction. Further, if each series of speed ratios in both the forward and reverse directions are compared, it may be seen that in both the forward and reverse directions, the consecutive changes in speed ratios from the travel speeds to the creeper speeds form a true geometric series.

For a detailed description of the structure and operation of the various elements of the present invention not specifically described herein, reference is made to my aforementioned patent.

Some summarization of the operation on the present invention relative to the operation of the transmission control valve 24 may be made although reference is made to my aforementioned patent for a complete description thereof. Firstly, the transmission control valve 24 may be operated from any one of twelve possible operated positions to any other one of those positions; secondly, no neutral position is provided for the valve spool 39, so that when valve spool 35 is in the parking position, the wheels 26 of the tractor are locked against any movement no matter what position the valve spool 39 is in; thirdly, when any one or more of the conduits leading from the transmission control valve 24 are supplied with hydraulic fluid under pressure, all of the other conduits are vented to the sump in the transfer drive case 17; fourthly, in any operated position of the transmission control valve 24 other than the neutral position of the valve spool 35, some torque reaction dependent upon the resistance encountered by the wheels 26, and excepting the parked position of the valve spool 35, is applied to the ring gear 96 of the power divider 14 whereby a corresponding amount of the developed engine torque may be delivered to the main hydraulic pump 16; and lastly, with the valve spool 35 of the transmission control valve 24 operated to the neutral position none of the engine power may be delivered to the main hydraulic valve 16 or the wheels 26.

Having described the invention what is considered new and desired to be protected by Letters Patent is:

1. In a vehicle having traction means and having an engine for operating said traction means, a power train from said engine to said traction means to operate said traction means selectively in the forward and reverse directions at two different speeds, said power train including a transmission comprising four planetary sets, each of said planetary sets having a sun gear, a planet gear carrier, a plurality of planet gears journalled on said carrier, and a ring gear, each of said sun gears being formed of the same size, each of said planet gears being formed of the same size, and each of said ring gears being formed of the same size, said source of power being connected to drive the sun gears of the first and second planetary sets, a selectively operable brake for the carrier of said first set, the ring gear of said first set being connected to drive the carrier of said second set, a selectively operable brake for the ring gear of said second set, said carrier of said second set being connected to drive the carrier of said third set and the sun gear of said fourth set, a selectively operable brake for the ring gear of said third set, a selectively operable brake for the ring gear of said fourth set, and the sun gear of said third set and the carrier of said fourth set being connected to drive said traction means in the forward and reverse directions at two different speeds dependent upon the operation of said brakes.

2. In a vehicle as claimed in claim 1, wherein parking means is provided for simultaneously energizing the selectively operable brakes for the carrier of said first set and the ring gear of said second set.

3. In a vehicle as claimed in claim 1, wherein said selectively operable brakes each comprise a plurality of stationary friction disks and a plurality of rotating friction disks alternately arranged between a pressure reaction plate and a pressure plate, and wherein a plurality of torque rods are provided for the selectively operable brakes for the carrier of said first set and the ring gear of said second set, and another plurality of torque rods are provided for the selectively operable brakes for the ring gear of said third set and the ring gear of said fourth set, said selectively operable brake for the carrier of said first set having the same pressure reaction plate as the selectively operable brake for the ring gear of said second set, said selectively operable brake for the ring gear of said third set having the same pressure reaction plate as the selectively operable brake for the ring gear of said fourth set, said plurality of torque rods for the selectively operable brakes for said carrier of said first set and said ring gear of said second set being secured intermediate the ends thereof about the periphery of the pressure reaction plate therefor, said plurality of torque rods for said selectively operable brakes for the ring gear of said third set and said ring gear of said fourth set being secured intermediate the ends thereof about the periphery of said pressure reaction plate therefor, each of said pluralities of torque rods being positioned in slots about the peripheries of the cooperating stationary friction disks and the ends of each of said pluralities of torque rods being secured in said transmission.

4. In a vehicle as claimed in claim 1, wherein said sun gear of said third set and said carrier of said fourth set are connected to drive said traction means through an output member, and selectively operable clutching means for connecting the planet carrier of said third set to said output member, whereby a third speed is provided for driving said traction means, and wherein said third speed is an intermediate speed ratio between said two different speeds of a value wherein said two different speeds and said intermediate speed form a geometric series.

5. In a vehicle as claimed in claim 4, wherein said clutching means is formed to be removable and replaceable on said transmission without breaking the connection of the sun gear of said third set and the carrier of said fourth set to said traction means.

6. In a vehicle having traction means and having an engine for operating said traction means, a power train from said engine to said traction means to operate said traction means selectively in the forward and reverse directions at two different speeds, said power train incuding a transmission comprising a transmission housing, four planetary sets, each of said planetary sets having a sun gear, a planet gear carrier, a plurality of planet gears journalled on said carrier, and a ring gear, each of said sun gears having the same diameter, each of said planet gears having the same diameter, and each of said ring gears having the same diameter, said source of power being connected to drive a stub shaft extending through said housing, said sun gears of said first and second planetary sets being splined on said stub shaft, a selectively operable brake for the carrier of said first set, the ring gear of said first set being secured to the carrier of said second set, a selectively operable brake for the ring gear of said second set, said carrier of said second set being secured to the carrier of said third set, said carriers of said second and third sets being rotatively mounted in said housing, the inner end of said stub shaft being rotatively mounted in the hub of said carrier of said second set, the sun gear of said fourth set being secured to the carrier of said third set, a selectively operable brake for the ring gear of said third set, a selectively operable brake for the ring gear of said fourth set, an output member rotatively mounted through said housing axially of said stub shaft, said sun gear of said third set and said carrier of said fourth set being keyed to said output member, said output member being connected to drive said traction means in the forward and reverse directions at two different speeds dependent upon the operations of said brakes.

7. In a vehicle as claimed in claim 6, wherein a second housing is provided, said second housing having a shaft rotatively mounted therein and extending therefrom, said second housing being removably secured to the portion of said transmission housing having said output member extending therefrom, said shaft extending axially through said output member and being splined into the hub of said carrier of said third set, said second housing including clutching means cooperating with the extending portion of said output member and said shaft for connecting said shaft to drive said output member, whereby a third speed is provided dependent upon the operation of said brakes and said clutching means.

8. In a vehicle as claimed in claim 7, wherein said power train includes means connecting said traction means to said output member so that the operation of said brake for the carrier of said first set produces movement of said vehicle in the reverse direction, so that operation of said brake for the ring gear of said second set produces movement of said vehicle in the forward direction, so that operation of said brake for the ring gear of said fourth set produces the lowest speed of said vehicle movement, so that the operation of said clutching means in said second housing produces the intermediate speed movement of said vehicle, so that operation of said brake for the ring gear of said third set produces the highest speed movement of said vehicle, so that said low, intermediate and high speed ratios form a geometric series, and whereby overdrive speeds are produced in the reverse direction relative to the forward direction of movement of said vehicle.

9. In a vehicle having traction means and having an engine for operating said traction means, a power train from said engine to said traction means to operate said traction means selectively in the forward and reverse directions at two different speeds, said power train including a transmission comprising four planetary sets, each of said planetary sets having a sun gear, a planet gear carrier, a plurality of planet gears journalled on said carrier, and a ring gear, said source of power being connected to drive the sun gears of the first and second planetary sets, a selectively operable brake for the carrier of said first set, the ring gear of said first set being connected to drive the carrier of said second set, a selectively operable brake for the ring gear of said second set, said carrier of said second set being connected to drive the carrier of said third set and the sun gear of said fourth set, a selectively operable brake for the ring gear of said third set, a selectively operable brake for the ring gear of said fourth set, and the sun gear of said third set and the carrier of said fourth set being connected to drive said traction means in the forward and reverse directions at two different speeds dependent upon the operation of said brakes.

10. In a vehicle having traction means and having an engine for operating said traction means, a power train from said engine to said traction means to operate said traction means selectively in the forward and reverse directions at the two different speeds, said power train including a transmission comprising a transmission housing, four planetary sets, each of said planetary sets having a sun gear, a planet gear carrier, a plurality of planet gears journalled on said carrier, and a ring gear, said source of power being connected to drive a stub shaft extending through said housing, said sun gears of said first and second planetary set being splined on one end of said stub shaft, a selectively operable brake for the carrier of said first set, the ring gear of said first set being secured to the carrier of said second set, a selectively operable brake for the ring gear of said second set, said carrier of said second set being secured to the carrier of said third set, said carriers of said second and third sets being rotatively mounted in said housing, the other end of said stub shaft being rotatively mounted in the hub of said carrier of said second set, the sun gear of said fourth set being secured to the carrier of said third set, a selectively operable brake for the ring gear of said third set, a selectively operable brake for the ring gear of said fourth set, an output member rotatively mounted through said housing axially of said stub shaft, said sun gear of said third set and said carrier of said fourth set being keyed to said output member, said output member being connected to drive said traction means in the forward and reverse directions at two different speeds dependent upon the operations of said brakes.

11. In a vehicle as claimed in claim 10, wherein a second housing is provided, said second housing having a shaft rotatively mounted therein and extending therefrom, said second housing being removably secured to the portion of said transmission housing having said output member extending therefrom, said shaft extending axially through said output member and being splined into the hub of said carrier of said third set, said second housing including clutching means cooperating with the extending portion of said output member and said shaft for connecting said shaft to drive said output member, whereby a third speed is provided dependent upon the operation of said brakes and said clutch means.

References Cited in the file of this patent

UNITED STATES PATENTS

| | | |
|---|---|---|
| 2,550,082 | Orr | Apr. 24, 1951 |
| 2,592,537 | Burtnett | Apr. 15, 1952 |
| 2,597,245 | Kelbel | May 20, 1952 |
| 2,633,760 | Kelley | Apr. 7, 1953 |
| 2,689,489 | Storer et al. | Sept. 21, 1954 |